(12) United States Patent
Gauger, Jr. et al.

(10) Patent No.: US 7,627,352 B2
(45) Date of Patent: Dec. 1, 2009

(54) HEADSET AUDIO ACCESSORY

(76) Inventors: Daniel M. Gauger, Jr., c/o Bose Corporation, The Mountain, Framingham, MA (US) 01701; Joji Ueda, c/o Bose Corporation, The Mountain, Framingham, MA (US) 01701

( * ) Notice: Subject to any disclaimer, the term of this patent is extended or adjusted under 35 U.S.C. 154(b) by 460 days.

(21) Appl. No.: 11/390,718

(22) Filed: Mar. 27, 2006

(65) Prior Publication Data
US 2007/0225035 A1 Sep. 27, 2007

(51) Int. Cl.
*H04M 1/00* (2006.01)

(52) U.S. Cl. .............. 455/569.1; 455/575.1; 455/556.1; 381/80; 381/85

(58) Field of Classification Search ... 455/569.1–569.2, 455/575.1–575.6, 556.1–558, 90.3; 381/60, 381/65, 68, 357
See application file for complete search history.

(56) References Cited

U.S. PATENT DOCUMENTS

| 5,604,813 | A | | 2/1997 | Evans et al. |
| 5,787,180 | A | * | 7/1998 | Hall et al. .................. 381/357 |
| 5,825,897 | A | * | 10/1998 | Andrea et al. .............. 381/71.6 |
| 5,951,141 | A | | 9/1999 | Bradley |
| 5,978,689 | A | * | 11/1999 | Tuoriniemi et al. ....... 455/569.1 |
| 5,991,637 | A | | 11/1999 | Mack |
| 6,061,456 | A | * | 5/2000 | Andrea et al. .............. 381/71.6 |
| 6,108,415 | A | * | 8/2000 | Andrea ........................ 381/357 |
| 6,415,034 | B1 | | 7/2002 | Hietanen et al. |
| 6,507,650 | B1 | * | 1/2003 | Moquin ................. 379/387.01 |
| 6,873,862 | B2 | | 1/2003 | Reshefsky |
| 6,975,984 | B2 | * | 12/2005 | MacAuslan et al. ......... 704/208 |
| 7,155,214 | B2 | | 12/2006 | Struthers et al. |
| 7,181,233 | B2 | * | 2/2007 | Fry .......................... 455/90.2 |
| 7,187,948 | B2 | * | 3/2007 | Alden ....................... 455/557 |
| 7,190,797 | B1 | * | 3/2007 | Johnston et al. ............... 381/74 |
| 7,251,332 | B2 | * | 7/2007 | Eves ........................... 381/11 |
| 7,254,420 | B1 | * | 8/2007 | Klein ...................... 455/569.1 |

(Continued)

FOREIGN PATENT DOCUMENTS

DE   20 2006 004 625    6/2006

(Continued)

OTHER PUBLICATIONS

Tekkeon, myTalker Compatibility, http://www.tekkeon.com/site/products-mytalker-ompat.php, downloaded Jan. 24, 2006. Site Copyright 2004, 2005, Publication date unknown.

(Continued)

*Primary Examiner*—Lana N Le
(74) *Attorney, Agent, or Firm*—Bose Corporation (57) ABSTRACT

An audio accessory for a headset. The accessory includes a first circuit for wirelessly receiving audio signals from a first external source of audio signals, a second circuit for mechanically coupling to a second external source of audio signals for receiving the audio signals from the second external source of audio signals, controlling circuitry for controlling the relative amplitude of audio signals from the first external source and the second external source transmitted to a playback device, a connector for detachably coupling to the playback device to transmit audio signals from the controlling circuitry to the playback device, and circuitry communicatingly coupling the controlling circuitry and the connector for transmitting audio signals from the controlling circuitry to the connector.

32 Claims, 9 Drawing Sheets

U.S. PATENT DOCUMENTS

| | | | |
|---|---|---|---|
| 7,292,880 B2* | 11/2007 | Lehtonen | 455/569.1 |
| 7,346,176 B1* | 3/2008 | Bernardi et al. | 381/92 |
| 7,395,090 B2* | 7/2008 | Alden | 455/557 |
| 7,433,715 B2* | 10/2008 | Buckley et al. | 455/569.1 |
| 2001/0050991 A1* | 12/2001 | Eves | 381/11 |
| 2001/0050993 A1 | 12/2001 | Douglas | |
| 2001/0053228 A1 | 12/2001 | Jones | |
| 2002/0102005 A1 | 8/2002 | Lin | |
| 2004/0136522 A1 | 7/2004 | Wurtz | |
| 2004/0198436 A1 | 10/2004 | Alden | |
| 2004/0204185 A1 | 10/2004 | Snyder et al. | |
| 2005/0004796 A1* | 1/2005 | Trump et al. | 455/90.3 |
| 2005/0064915 A1 | 3/2005 | Lair | |
| 2005/0090295 A1* | 4/2005 | Ali et al. | 455/575.2 |
| 2005/0130697 A1 | 6/2005 | Dyer | |
| 2005/0146227 A1 | 7/2005 | Jackson | |
| 2005/0177365 A1* | 8/2005 | Ikeda | 704/226 |
| 2005/0181826 A1 | 8/2005 | Yueh | |
| 2005/0232448 A1 | 10/2005 | Kung | |
| 2005/0239434 A1 | 10/2005 | Marlowe | |
| 2006/0013410 A1 | 1/2006 | Wurtz | |
| 2006/0046656 A1 | 3/2006 | Yang | |
| 2006/0046778 A1 | 3/2006 | Hembree | |
| 2006/0134959 A1 | 6/2006 | Ellenbogen | |
| 2006/0166705 A1 | 7/2006 | Seshadri et al. | |
| 2006/0193479 A1 | 8/2006 | Harvey et al. | |
| 2007/0015486 A1 | 1/2007 | Marlowe | |
| 2007/0025561 A1 | 2/2007 | Gauger | |
| 2007/0036384 A1 | 2/2007 | Struthers et al. | |
| 2007/0041582 A1 | 2/2007 | Lam | |
| 2007/0082612 A1* | 4/2007 | Valve et al. | 455/41.2 |
| 2007/0225035 A1 | 9/2007 | Gauger et al. | |
| 2007/0226384 A1 | 9/2007 | Robbin et al. | |
| 2007/0239849 A1 | 10/2007 | Robbin et al. | |
| 2007/0247794 A1 | 10/2007 | Jaffe et al. | |
| 2008/0167092 A1* | 7/2008 | Ueda et al. | 455/575.2 |
| 2008/0201138 A1* | 8/2008 | Visser et al. | 704/227 |

FOREIGN PATENT DOCUMENTS

| | | |
|---|---|---|
| EP | 0583900 | 2/1994 |
| EP | 10915431 A1 | 4/2001 |
| EP | 1608202 | 12/2005 |
| GB | 234308 | 5/1925 |
| GB | 2272129 | 5/1994 |
| GB | 2343080 A | 4/2000 |
| JP | 2000224683 | 8/2000 |
| JP | 2001016679 | 1/2001 |
| JP | 2001100794 | 4/2001 |
| JP | 2001103355 | 4/2001 |
| WO | 0010362 | 2/2000 |
| WO | 0038044 | 6/2000 |
| WO | 0201910 | 1/2002 |
| WO | WO 0203746 | 1/2002 |
| WO | 2004080123 | 9/2004 |
| WO | 2005029825 A1 | 3/2005 |
| WO | 2006129205 | 12/2006 |
| WO | 2006130115 | 12/2006 |
| WO | 2007031703 | 3/2007 |
| WO | 2007049075 | 5/2007 |

OTHER PUBLICATIONS

Tekkeon, myTalker Tech Specs, http://www.tekkeon.com/site/products-mytalker-specs.php, downloaded Jan. 24, 2006, Site Copyright 2004, 2005, Publication date unknown.

Tekkeon, myTalker Features, http:www.tekkeon.com/site/products-mytalker-features.php, downloaded Jan. 24, 2006, Site Copyright 2004, 2005, Publication date unknown.

Tekkeon, myTalker Bluetooth Gateway for iPod and MP3 Players Data Sheet, Copyright 2006, Site Copyright 2004, 2005, Publication date unknown.

Hardware Zone, Tekkeon Enables Mobile Phone Calls Using iPod/MP3 Headphones, San Francisco, MacWorld, Jan. 10, 2006. http//www.hardwarezone.com/news/view.php?id3523&cid=2&src=rss, download Jan. 24, 2006.

TreoCentral.com—SkullCandy headset? pp. 1-3, http://discuss.treocentral.com/archive/index.php/t-33954.html, downloaded Nov. 3, 2005, Publication date unknown.

Amazon.com: Electronics: Skullcandy SCE-3B Skullcandy Earbud with 3-Bar . . . p. 1 of 1, http//www.amazon.com/gp/product/B00009WE3O/sr=1-18/qid=1131032711/ref=sr_1_18/102-71..., downloaded Nov. 3, 2005, Publication date unknown.

Amazon.com: Electronics: Skullcandy SCE-3B Skullcandy Backphones with 3-. . . p. 1 of 2, http//www.amazon.com/gp/product/B00009WE3M/102-7181297-1030518?v=glance& n=172282..., downloaded Nov. 3, 2005, Publication date unknown.

Kapica, J. Globeandmail.com, Skullcandy Link, Thursday, Oct. 23, 2003, Posted at 9:01 AM EST, http://www.globetechnology.com/servlet/story/RTGAM.20031021.gtskullrevoct21/BNPrint/Tech..., downloaded Nov. 3, 2005.

Bluetake Technology BT420, Bluetooth®, Hi-Fi Sports Headphone, Copyright 2004. www.bluetake.com., Publication date unknown.

i-Phono BT420EX Bluetooth Hi-Fi Sports Headphone Kit, pp. 1-5, http//www.bluetake.com/products/BT420EX/BT420EX_subS.htm, downloaded Nov. 3, 2005, Publication date unknown.

BlueTake BT420ex Bluetooth Stereo Headset, pp. 1 of 2, http//www.behandsfree.com/ProductInfo.aspx?productid=WHEAD1014, downloaded Nov. 3, 2005, Publication date unknown.

Amazon.com: Electronics: Skullcandy SCE-N4 Skullcandy Earbud For Nokia; 4-Barrel 2.5 MM Pin . . . p. 1 of 1, http//www.amazon.com/gp/product/tech-data/B00009WE3P/ref=dp_nav_0/102-7181297-103051..., downloaded Nov. 3, 2005, Publication date unknown.

Skullcandy, Portable Link User's Guide, pp. 1-2, http://www.skullcandy.com/manuals/LinkUserGuide.pdf, downloaded Nov. 11, 2005, Publication date unknown.

BlueTake i-Phono BT420EX Bluetooth Hi-Fi Sports Headphone Kit; BlueTake Bringing Enhanced Enjoyment; from website: www.bluetake.com/products/BT420EX/BT420EXsubS.htm (Nov. 3, 2005 (2 pages).

BlueTake Technology; Bluetooth Hi-Fi Sports Headphone BT420; Bluetooth Technology Co., Ltd. From website: vvww.bluetake.com; 2004 (1 page).

Skullcandy Portable Link User's Guide; Skullcandy at 435-940-1545 (2 pages).

Globeandmail.com; Skullcandy Link by Jack Kapica, from website: wvvw.globetechnology..com/servlet/story/RTGAM.20031021.gtskullrevoct21; Nov. 3, 2005 (2 pages).

Skullcandy SCB-3B Skullcandy Backphones With 3-Barrel Universal Cellphone Connector; from website: Amazon.com: Electronics: Skullcandy SCB-3B Skullcandy Backphones; Nov. 3, 2005 (2 pages).

Skullcandy SCE-3B Skullcandy Earbud With 3-Barrel Universal Cellphone Connector; from website: Amazon.com: Electronics: Skullcandy SCE-3B Skullcandy Earbud With 3-Bar . . . Nov. 3, 2005 (2 pages).

TreoCentral.com—SkullCandy Headset; from website: discuss.treocentral.com/archive/index/php/t-33954.html; Nov. 3, 2005 (3 pages).

HardwareZone: News Flash At A Glance!; from website: www.hardwarezone.com/news/view.php?id=3523&cid=2&src=rss; Jan. 24, 2006 (4 pages).

Tekkeon—Cut Loose—Stay Loose; from website: www.tekkeon.com/site/products-mytalker-features-php; Jan. 24, 2006 (2 pages).

Tekkeon—Cut Loose—Stay Loose; myTalker Tech Specs; from website: www.tekkeon.com/site/products-mytalker-specs.php; Jan. 24, 2006 (2 pages).

International Search Report and Written Opinion in Application No. PCT/US2008/050216, dated Sep. 4, 2008.

-TreoCentral.com SkullCandy headset? pp. 1-3, http://discuss.treocentral.com/archive/index.php/t-33954.html, downloaded Nov. 3, 2005, Publication date unknown. <http://discuss.treocentral.com/archive/index.php/t-33954.html>.

"Bluetooth Wireless Stereo Solutions, User Manual (GBMA201, GBMH201, GBMHKIT)," Iogear, Copyright 2005 (retrieved on May 26, 2008), retrieved from the Internet: <URL:http://www.iogear.com/support/dm/manual/GBMH201#display>.

"Blueye Cyclops Bluetooth Stereo Headphone," Philippines Hardware Zone, Jan. 29, 2006 (retrieved on May 26, 2008), retrieved from the Internet: <URL:http://ph.hardwarezone.com/news/view.php?cid=8&id=3526>.

Invitation to Pay Additional Fees dated Jun. 6, 2008 from International Application.

Amazon.com: Electronics: Skullcandy SCE-N4 Skullcandy Earbud For Nokia; 4-Barrel 2.5 MM Pin . . . p. 1 of 1, http//www.amazon.com/gp/product/tech-data/B00009WE3P/ref=dp_nav_0/1 02.7181297-103051..., downloaded Nov. 3, 2005, Publication date unknown.

Skullcandy, Portable Link User's Guide, pp. 1-2, http://www.skullcandy.com/manuals/LinkUserGuide.pdf, downloaded Nov. 11, 2005.

http://www.uflymike.com/index.htm, pp. 1-2, Downloaded Apr. 18, 2005. <http://www.uflymike.com/index.htm>.

The Bose Aviation Headset X Owner's Guide, Version AM270261_OOV.pdf, May 16, 2003.

The Bose QuietComfort Acoustic Noise Cancelling Headphones Guide, Version AM257565 00 V.odf, May 13, 2003.

Combat Vehicle Crewman Headset Brochure Bose Corporation 2000.

Combat Vehicle Crewman Headset Parts List Bose Corporation 1998.

International Preliminary Report on Patentability dated Mar. 10, 2008 for Appl. No. PCT/US07/064913.

International Search Report and Written Opinion dated Aug. 16, 2007 for Appl. PCT/US07/064913.

theBoom Quiet. http://www.theboom.com/ProductDetails.asp-?ProductCode=571&Show=TechSpects downloaded Jan. 3, 2007.

Creative Worldwide Headset CB2455. http://www.creative.com/products/product.asp?category=437&subcategory=442&product downloaded Jan. 3, 2006.

Plantronics Puisar 590A Bluetooth® Headset. http://www.headsetgenie.com/product info.php?cPath=8&products id=318 downloaded Jan. 3, 2007.

International Preliminary Report on Patentability dated Mar. 19, 2009 for Appl. No. PCT/US08/050216.

Anonymous, "Combining telephony capability with portable music devices", vol. 43, No. 665, Research Disclosure, Mason Publications (Mar. 2001).

Tekkeon—Cut Loose—Stay Loose: "myTalker Compatibility" from website: www.tekkeon.com/site/products-mytalker-compat.php, Jan. 24, 2006 (2 pages).

BlueTake BT420ex Bluetooth Stereo Headset from website: www.behandsfree.com/ProductInfo.aspx?productid=WHEAD1014, Nov. 3, 2005 (2 pages).

BlueTake i-Phono BT420EX Bluetooth Hi-Fi Sports Headphone Kit; BlueTake Bringing Enhanced Enjoyment; from website: www.bluetake.com/products/BT420EX/BT420EXsubS.htm (Nov. 3, 2005 (2 pages).

Bluetake Technology; Bluetooth Hi-Fi Sports Headphone BT420; Bluetooth Technology Co., Ltd. From website: vvww.bluetake.com; 2004 (1 page).

Skullcandy Portable Link User's Guide; Skullcandy at 435-940-1545 (2 pages), Nov. 3, 2005.

Globeandmail.com; Skullcandy Link by Jack Kapica, from website: wvvw.globetechnology..com/servlet/story/RTGAM.20031021.gtskullrevoct21; Nov. 3, 2005 (2 pages).

Skullcandy SCB-3B Skullcandy Backphones With 3-Barrel Universal Cellphone Connector; from website: Amazon.com: Electronics: Skullcandy SCB-3B Skullcandy Backphones; Nov. 3, 2005 (2 pages).

Skullcandy SCE-3B Skullcandy Earbud With 3-Barrel Universal Cellphone Connector; from website: Amazon.com: Electronics: Skullcandy SCE-3B Skullcandy Earbud With 3-Bar . . . Nov. 3, 2005 (2 pages).

TreoCentral.com—SkullCandy Headset; from website: discuss.treocentral.com/archive/index/php/t-33954.html; Nov. 3, 2005 (3 pages).

HardwareZone: News Flash At A Glance!; from website: www.hardwarezone.com/news/view.php?id=3523&cid=2&src=rss; Jan. 24, 2006 (4 pages).

Tekkeon—Cut Loose—Stay Loose; from website: www.tekkeon.com/site/products-mytalker-features-php; Jan. 24, 2006 (2 pages).

Tekkeon—Cut Loose—Stay Loose; myTalker Tech Specs; from website: www.tekkeon.com/site/products-mytalker-specs.php; Jan. 24, 2006 (2 pages).

* cited by examiner

HEADSET AUDIO ACCESSORY

BACKGROUND

This specification describes an audio accessory intended for use with a headphone or a headset to manage multiple sources of audio signals.

SUMMARY

In one aspect of the invention, an audio accessory includes a first circuit for wirelessly receiving audio signals from a first external source of audio signals; a second circuit for mechanically coupling to a second external source of audio signals for receiving the audio signals from the second external source of audio signals; controlling circuitry for controlling the relative amplitude of audio signals from the first external source and the second external source transmitted to a playback device; a connector for detachably coupling to the playback device to transmit audio signals from the controlling circuitry to the playback device; and circuitry communicatingly coupling the controlling circuitry and the connector for transmitting audio signals from the controlling circuitry to the connector. The second circuit may be constructed and arranged to wirelessly receive audio signals. The connector may be constructed and arranged to mate with a headset. The first external audio signal source may be a cellular telephone and the audio accessory may further include a microphone for providing voice audio signals and circuitry constructed and arranged to transmit the voice audio signals from the microphone to the cellular telephone. The microphone may be a boom microphone includes a boom assembly and the circuitry may be constructed and arranged to transmit the voice audio signals from the microphone and the connector may include circuitry integrated into the boom assembly coupling the microphone and the connector. The connector may be constructed and arranged to mechanically and electrically couple the boom microphone to a headset. The audio accessory may be configured so that the boom microphone has a retracted position and an unretracted position. In the retracted position, the boom microphone may be configured as an omnidirectional microphone and in the unretracted position, the boom microphone may be configured as a bidirectional microphone. The controlling circuitry may include a switch to select audio signals from one of the first circuit and the second circuit, and the audio accessory may be configured so that moving the boom microphone from the retracted position to the unretracted position causes the switch to select the audio signals from the first circuit. The microphone may be a noise reducing microphone. The audio accessory may further include a cable constructed and arranged to transmit electrical power to at least one of the audio accessory, the first audio signal source and the second audio signal source. The controlling circuitry may include a switch for alternately selecting from the audio signals from the first audio signal source and audio signals from the second audio signal source for transmission to the connector. The audio accessory may further include a third circuit for receiving audio signals from a third audio signal source and the selecting circuitry may be constructed and arranged to alternatively select audio signals from the first external source, the second external source, and the third external source for transmission to the external playback device. The audio accessory may further include circuitry for pausing the operation of the external source generating the nonselected audio signals. The audio accessory may further include circuitry for communicating with a third external source of audio signals. The circuitry for communicating with a third external source of audio signals and the first circuit may share physical components. The communicatingly coupling circuitry may be an electrical cable. The audio accessory may further include circuitry for generating a side tone for transmission to the external playback device.

In another aspect of the invention, the headset assembly, includes: a headset; a accessory device for providing audio signals to the headset through a single input jack of the headset, the accessory device includes receiving circuitry for receiving audio signals from a plurality of audio signal sources, the receiving circuitry includes circuitry for wirelessly receiving audio signals from a wireless transmitter, and controlling circuitry for controlling the relative amplitude of audio signals from the plurality of audio signal sources for transmission to the headset through the single input jack. The receiving circuitry for wirelessly receiving audio signals may be constructed and arranged to receive audio signals wirelessly transmitted from a cellular telephone. The headset may further include a microphone for transducing pressure waves to voice audio signal and the accessory device may be further constructed and arranged to transmit the voice audio signals from the microphone to the cellular telephone. The accessory device may further include a boom microphone, wherein a plug and the single input jack mechanically couple the accessory device to the headset. The accessory device may be further constructed and arranged to transmit electrical power from the headset to the receiving circuitry. The controlling circuitry may includes a switch for alternatively selecting audio signals from one of the plurality of audio signal sources and another of the plurality of audio signal sources for transmission to the headset through the single input jack. The accessory device may further include circuitry for pausing the operation of the source of the nonselected audio signals.

In another aspect of the invention, a method for operating a personal audio system, includes wirelessly receiving first audio signals from a first audio signal source; receiving second audio signals from a second audio signal source; controlling the relative amplitude of the first audio signals and the second audio signals for transmission to a playback device to provide amplitude controlled first audio signals and second audio signals; and transmitting the amplitude controlled first and second audio signals through a single cable to the playback device. The receiving the second audio signals may include wirelessly receiving the second audio signals. The first audio signal source may include a cellular telephone, and the method may further include transducing pressure waves to voice audio signals and transmitting the voice audio signals to the cellular telephone. Transmitting the voice audio signals may include transmitting the voice audio signals through the single plug, jack, and cable. The method may further include providing electrical power from the playback device to at least one of circuitry for receiving the first audio signals, circuitry for receiving the second audio signals, and circuitry for controlling the relative amplitude of the first audio signals and the second audio signals. The controlling may include alternatively selecting audio signals from one of the first audio signal source and the second audio signal source for transmission to the playback device. The method may further include pausing the audio signal source providing the nonselected signals. The method may further include providing a side tone to the playback device.

In another aspect of the invention, a headset includes a headset; a accessory device for providing audio signals to the headset through a single input jack of the headset. The accessory device includes receiving circuitry for receiving audio signals from a plurality of audio signal sources. The receiving circuitry includes circuitry for wirelessly receiving audio signals from a wireless transmitter; a switch for selecting one of receiving audio signals from the wireless transmitter and not receiving audio signals from the wireless transmitter. The headset includes a boom microphone having a first position near a user's mouth and a second position not near a user's mouth. The headset assembly is configured so that moving the boom microphone from the second position to the first position causes the switch to select receiving audio signals from the wireless transmitter. The first position may be an unretracted position and the second position may be a retracted position.

In another aspect of the invention, a headset includes a boom microphone having a first position near a user's mouth and a second position not near a user's mouth. The boom microphone may be configured as a bidirectional microphone in the first position and an omnidirectional microphone in the second position. The first position may be an unretracted position and the second position may be a retracted position.

In yet another aspect of the invention, an accessory for use with a headset, includes a boom microphone having a first position near a user's mouth and a second position not near a user's mouth and further includes a connector, for connecting the boom microphone to a device includes two selectable sources of audio signals. The boom microphone may be constructed and arranged to select one of the audio sources in the first position and the other of the audio sources in the second position. The boom microphone may be constructed and arranged to non-exclusively select one of the audio signal sources in the first position and exclusively select the other of the audio signal sources in the second position. The first position may be an unretracted position and the second position may be a retracted position.

Other features, objects, and advantages will become apparent from the following detailed description, when read in connection with the following drawing, in which:

DETAILED DESCRIPTION

Though the elements of several views of the drawing may be shown and described as discrete elements in a block diagram and may be referred to as "circuitry", unless otherwise indicated, the elements may be implemented as one of, or a combination of, analog circuitry, digital circuitry, or one or more microprocessors executing software instructions. The software instructions may include digital signal processing (DSP) instructions. Unless otherwise indicated, signal lines may be implemented as discrete analog or digital signal lines, as a single discrete digital signal line with appropriate signal processing to process separate streams of audio signals, or as elements of a wireless communication system. Unless otherwise indicated, audio signals may be encoded in either digital or analog form. In this specification, an "earphone" refers to a device to fit in, on, or around an ear, typically including structure for sealing in, to, or around the ear, and including an acoustic driver to radiate acoustic energy into an earphone cavity. According to industry usage, the term "headphone" is frequently used to refer to a device including two earphones typically connected by a headband, but not including a microphone and the term "headset" refers to a device having a microphone either connected to it or as an integral part of it. Because the devices described in this specification are designed to be used with a headset or be used with a headphone to form a headset, the term "headset" is used throughout. In the several views of the drawing, some elements, such as accessory device 10, module 18, and others have different configurations in some of the views. The same reference numeral will be used throughout the specification, and the differences between the elements in the several views will be noted in the specification.

Figure 1A:
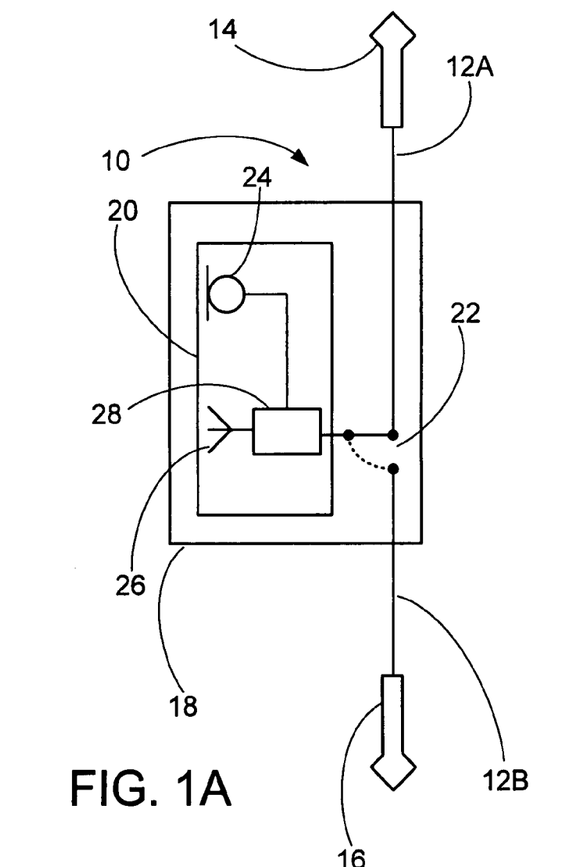
FIGS. 1A-1D are diagrammatic views of an audio accessory device.
Figure 1B:
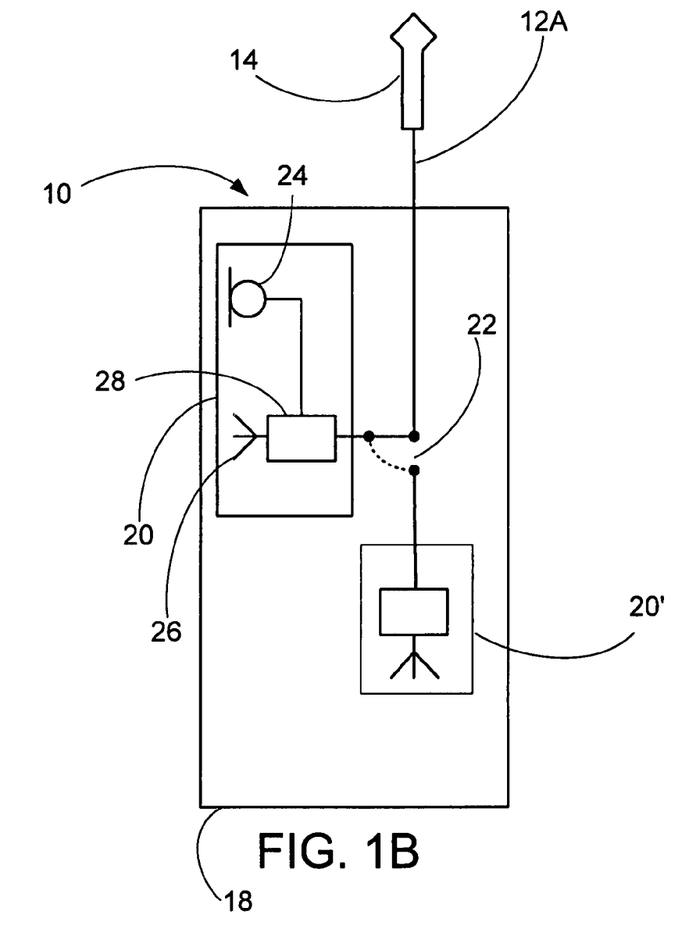
Figure 1C:
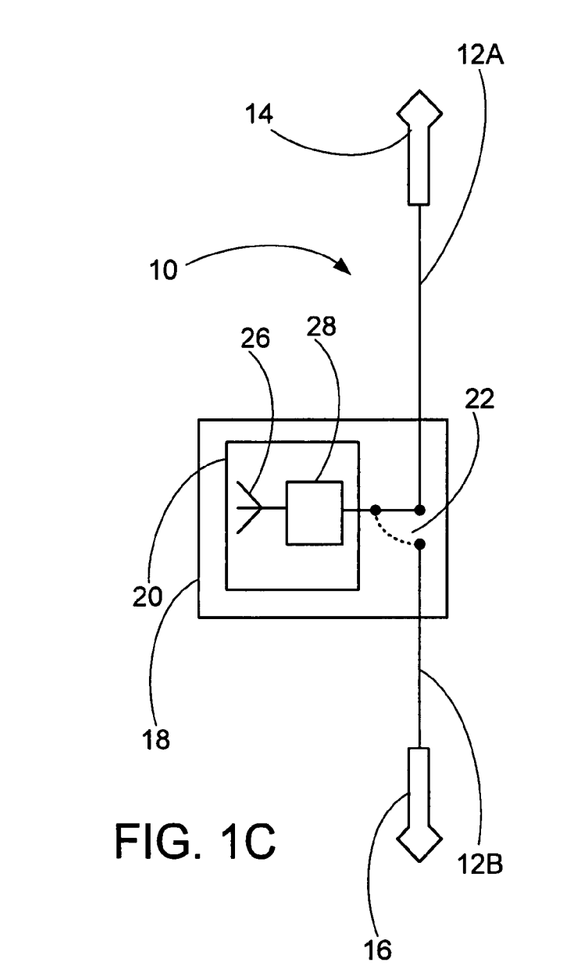
Figure 1D:
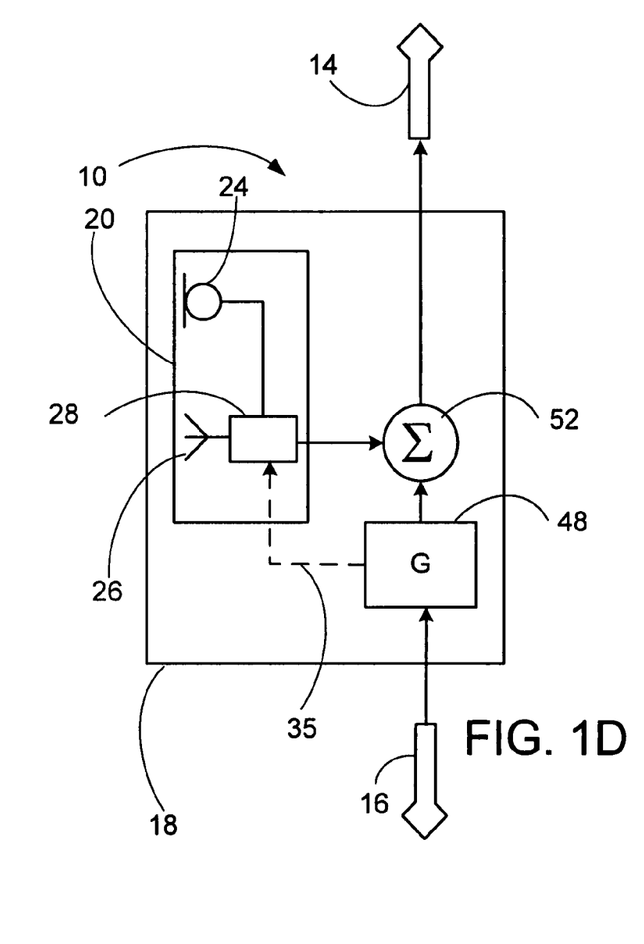

FIGS. 1A-1D show an audio accessory device intended to be used with a headset to form elements of a personal audio system. In FIG. 1A, an accessory device 10 includes a module 18, coupled to playback device detachable connector element 14 by cable portion 12A and coupled to audio signal source detachable connector element 16 by cable portion 12B. Module 18 includes wireless communication circuitry 20 and switch 22, which alternatively couples wireless communication circuitry 20 and audio signal source detachable connector element 16 to playback device detachable connector element 14. Wireless communication circuitry 20 may include a microphone 24, antenna 26, and processing circuitry 28, which may include radio circuitry and signal processing circuitry. In FIG. 1B, cable portion 12B and audio signal source detachable connector element 16 of FIG. 1A are replaced by wireless communication circuitry 20'. In FIG. 1C, the microphone 24 is absent so that accessory device 10 has no microphone. In devices using the configuration of FIG. 1C, there may be a microphone as a part of another component of a personal audio system, as will be described below. In the implementation of FIG. 1D, switch 22 is replaced by circuitry including amplifier 48 coupled to audio signal source detachable connector element 16 and to summer 52, which is coupled to playback device detachable connector element 14. Amplifier 48 may also be coupled to processing circuitry 28. The audio accessory device may include other amplifiers, which are not shown.

Figure 2A:
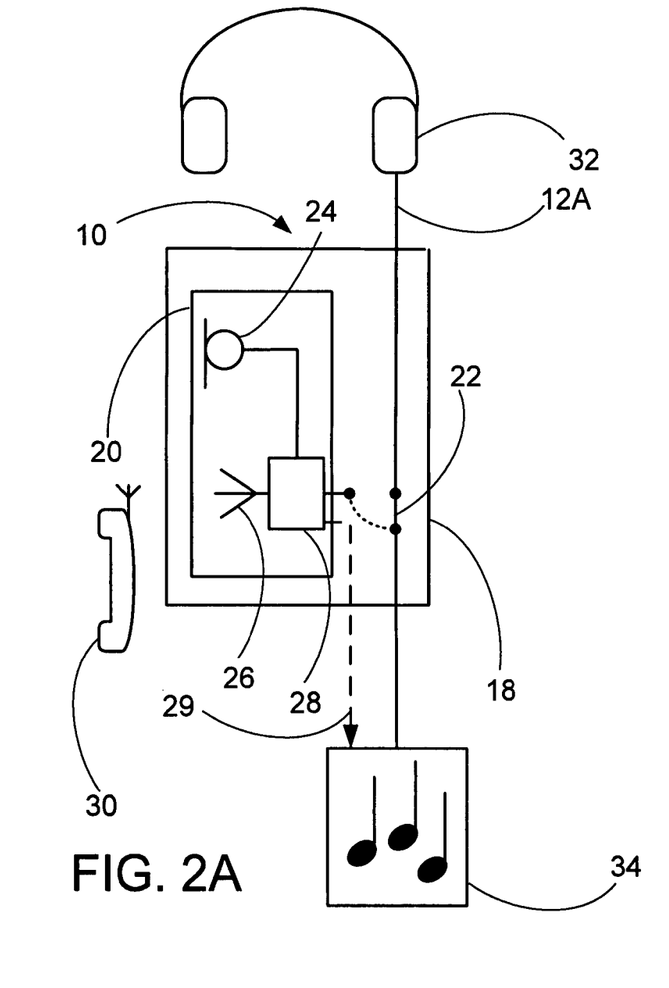
FIGS. 2A-2D are diagrammatic views of a personal audio system including the accessory device of FIGS. 1A and 1B.
Figure 2B:
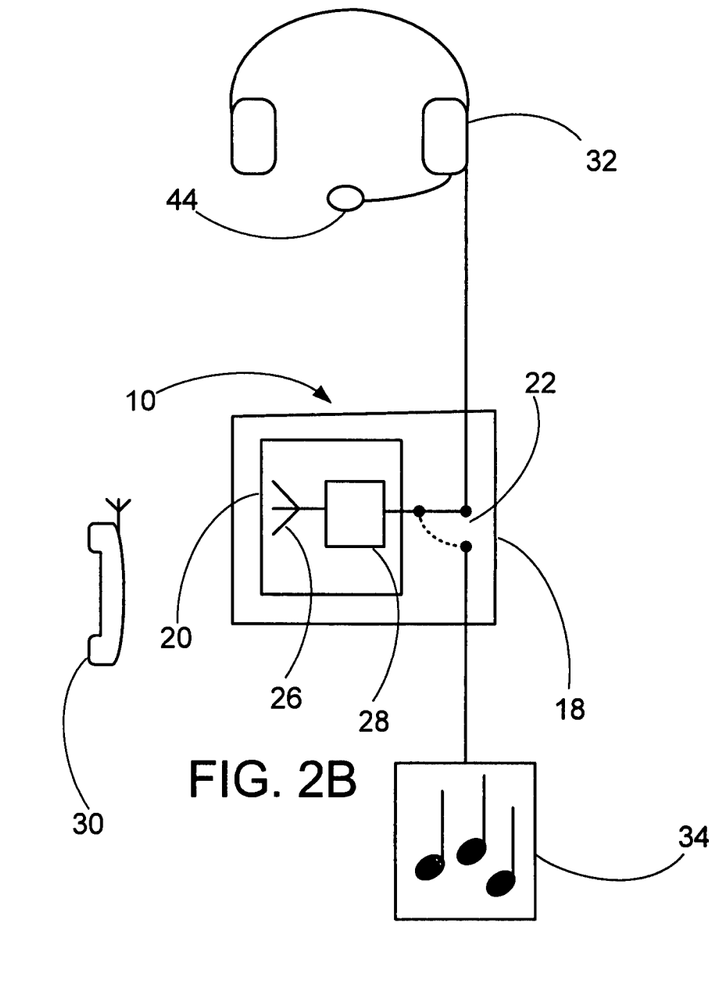
Figure 2C:
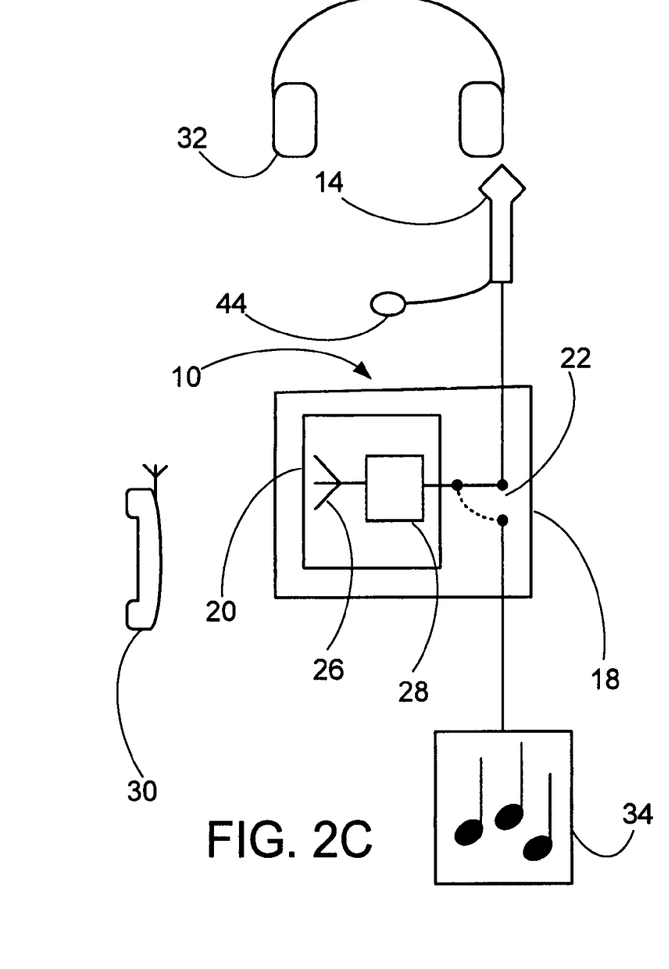

FIGS. 2A-2C show one of the accessory devices 10 of FIGS. 1A and 1C as a component of various configurations of a personal audio system, illustrating how the accessory device functions. In FIG. 2A, playback device detachable connector element 14 (not shown in this view) is detachably mated with an input jack of headset 32. Wireless communication circuitry 20 is constructed and arranged to communicate wirelessly with cellular telephone 30. Audio signal source detachable connector element 16 (not shown in this view) is detachably mated with an output jack of audio signal source 34. Optional control line 29 may couple processing circuitry 28 and audio signal source 34. FIG. 2B shows the microphoneless accessory device 10 of FIG. 1C mated with the input jack of a headset 32 equipped with a microphone, such as a boom microphone 44. In the configuration of FIG. 2B, detachable connector element 14 (not identified in this view) and cable portion 12A are configured to transmit the audio signal from the boom microphone 44 to wireless communication circuitry 20. In the implementation of FIG. 2C, boom microphone 44 is a component of accessory device 10. Playback device detachable connector element 14 may couple, electrically and mechanically, boom microphone 44 and module 18 to headset 32 via a jack in headset 32.

Figure 2D:
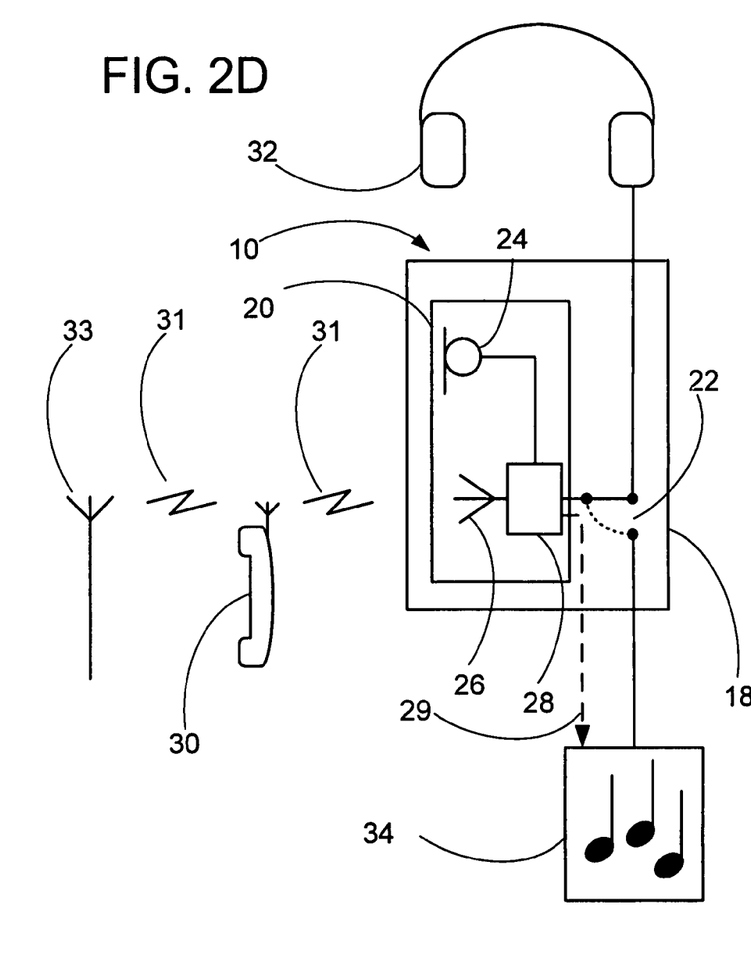

Referring to FIG. 2D, the operation of the accessory device will be described using the configuration of FIG. 2A, it being understood that the configuration of FIGS. 2B and 2C may function in a similar manner. In normal operation, accessory device 10 transmits to headset 32 audio signals from external audio signal source 34 as shown in FIG. 2A. If an audio signal transmission is received by wireless communication circuitry 20 from an external audio signal source such as cellular phone 30 (as indicated by wireless transmission symbols 31 and remote wireless transmission device 33 of FIG. 2D), the position of switch 22 is changed, as shown in FIG. 2D, so that signals from wireless communication circuitry 20 are transmitted to headset 32, causing microphone 24 and headset 32 to act as components of a "hands free" cellular telephone system. Prior to the changing of the position of switch 22, the accessory device may transmit a control signal over optional control line 29 to the audio signal source 34 to pause the transmission of audio signals from audio signal source 34 to headset 32. When the communication from cellular telephone 30 to wireless communication circuitry is terminated, the position of switch may change so that audio signals may resume being transmitted from audio signal source 34 to headset 32. If necessary, a control signal may be transmitted to audio signal source 34 over optional control line 29 to unpause the transmission of audio signals from audio signal source 34 to headset 32 so that the musical piece that the user was listening to resumes from the same point in the musical piece as it was prior to the pause. If cellular telephone 30 does not generate a side tone, wireless communication circuitry 20 may be constructed and arranged to generate the side tone. A side tone is an audio signal proportional to the microphone signal that is transmitted to the headset 32 to allow the user to hear through the headset 32, what the user says. A side tone is especially desirable if the headset 32 is a high performance passive or active noise reduction headset. In a high performance noise reduction headset, the attenuation of the user's own voice may result in the user not being able to hear him/her self well, which seems unnatural or uncomfortable. If the side tone is not provided locally (for example if the side tone is provided by transmitting from microphone 24 to cellular telephone 30, from cellular telephone 30 to processing circuitry 28 to headset 32 using a compressed wireless link), the delay may be annoying. If a side tone is generated it is desirable for microphone 24 to be a noise reducing microphone (for example a bi-directional microphone located in close proximity to the mouth) so that the side tone does not include ambient noise that the noise reducing headset is designed to attenuate. If the implementations of FIGS. 2A-2D are implemented with the accessory device of FIG. 1D, a user of headset 32 could hear both sound transmitted through wireless communication circuitry 20 and sound corresponding to audio signals from audio signal source 34, as indicated by the mixing of the audio signals at summer 52 of FIG. 1D. Optionally, a person conversing with the headset user over the wireless communication circuitry 20 could hear both sound from the headset user and sound corresponding to signals from audio signal source 34. The gain G of amplifier 48 of FIG. 1D can be controllable to permit the user of the headset to control the relative amount of sound from the wireless communication circuitry and sound from the audio signal source 34 and optionally to control the relative amount of sound from the microphone 24 and the sound from the audio signal source 34 as indicated by signal line 35. If the gain G of amplifier 48 of FIG. 1D is zero when there is transmission from wireless communications circuitry 20 and unity when there is no transmission from wireless communications circuitry 20, an audio accessory device of FIG. 1D functions equivalently to the audio accessory device of FIG. 1A. In another alternative, the function of switch 22 could be implemented as muting circuitry that, in the event of transmission from wireless communications circuitry 20, mutes the input from audio signal source 34.

In one embodiment, cable portions 12A and 12B may be conventional stereo audio cable. Playback device detachable connector element 14 and audio signal source detachable connector element 16 may be a plug constructed and arranged to mate with a 3.5 mm stereo jack to detachably couple the accessory device 10 to playback device such as headset 32 or to an external music source 34, respectively. Module 18 may be implemented as a so-called "dongle" between cable portions 12A and 12B. Antenna 26 and processing circuitry 28 may be conventional elements associated with wireless "hands free" devices for cell phone systems. Cell phone 30 may be a conventional cell phone adapted to transmit wirelessly according to voice bandwidth hands-free profile (HFP) or the headset profile (HSP) of the Bluetooth wireless communications standard defined by the Bluetooth Special Interest Group (SIG), available at URL address www.bluetooth.org. For purposes of explanation, switch 22 is shown as a two position switch. In some implementations, switch 22 may be implemented as a suitably programmed digital signal processing (DSP) device so that, for example, control signals can be communicated between processing circuitry 20 and audio signal device 34 as discussed in the description of the function of control line 29, so that control line 29 can be integrated into cable portion 12B, and so that the implementations of FIGS. 1A-1C can be implemented with the same components as the implementation of FIG. 1D. In other implementations, switch 22 may be implemented as a manually or electronically controllable analog switch. Audio signal source 34 may be an MP3 player, such as an iPod® mobile digital device manufactured by Apple Corporation of Cupertino, Calif., or a CD player, or a jack of an audio system of an airplane, or others. Headset 32 may be one of a wide variety of devices, such as a single earbud "hands free" cell phone headset; an interaural, circumaural, or supra-aural stereo passive or active noise reduction headset; or a communications headset; or the like.

Figure 3A:
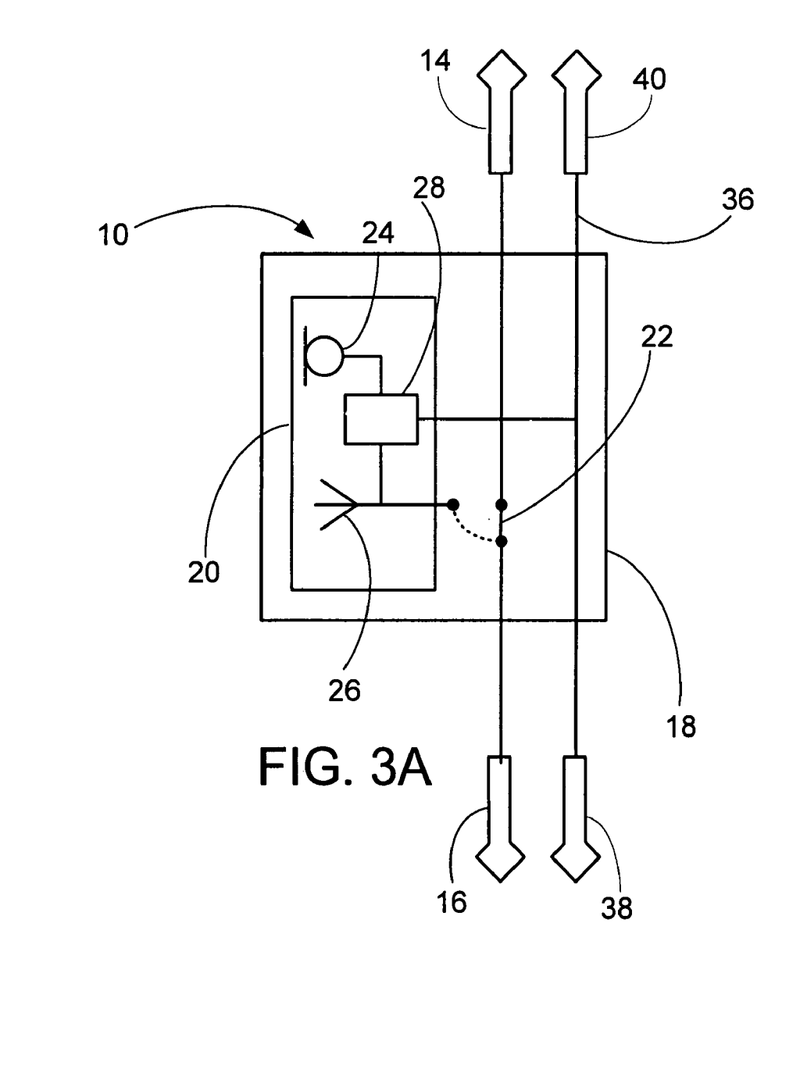
FIGS. 3A-3D are diagrammatic views of an audio accessory device.
Figure 3B:
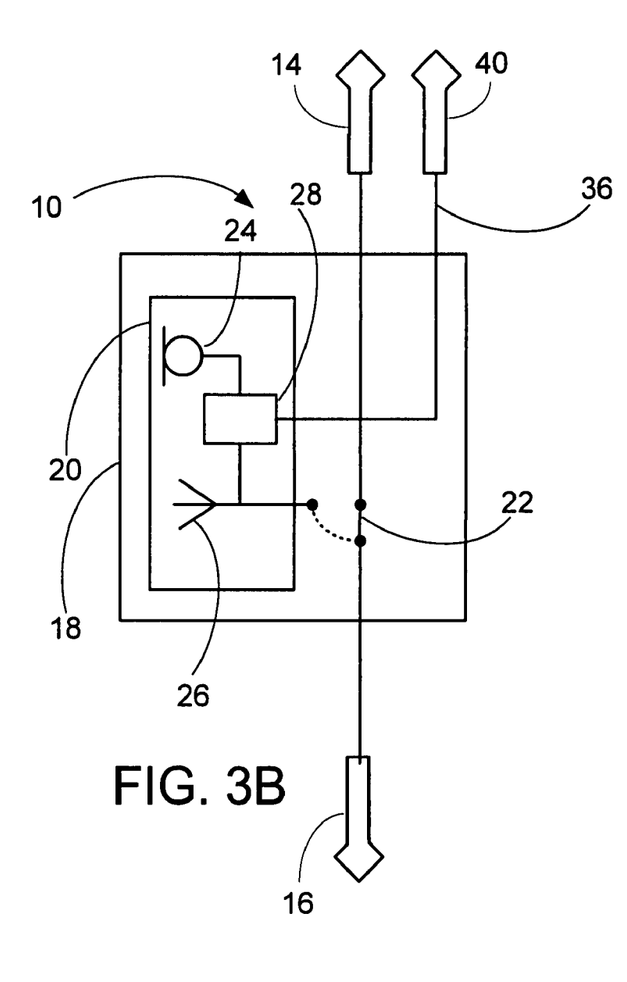
Figure 3C:
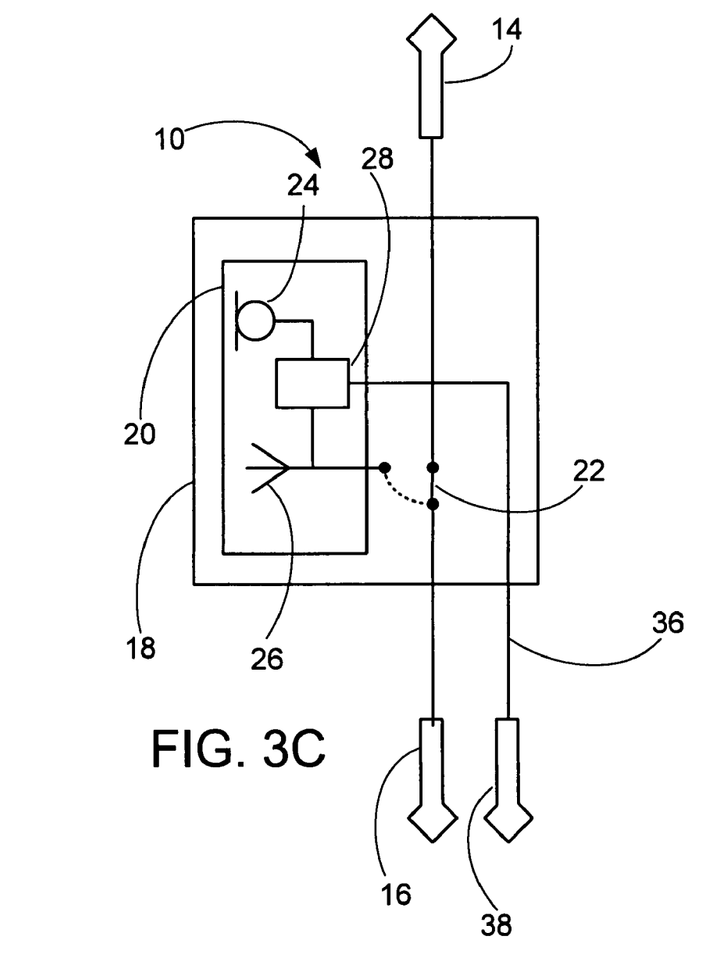
Figure 3D:
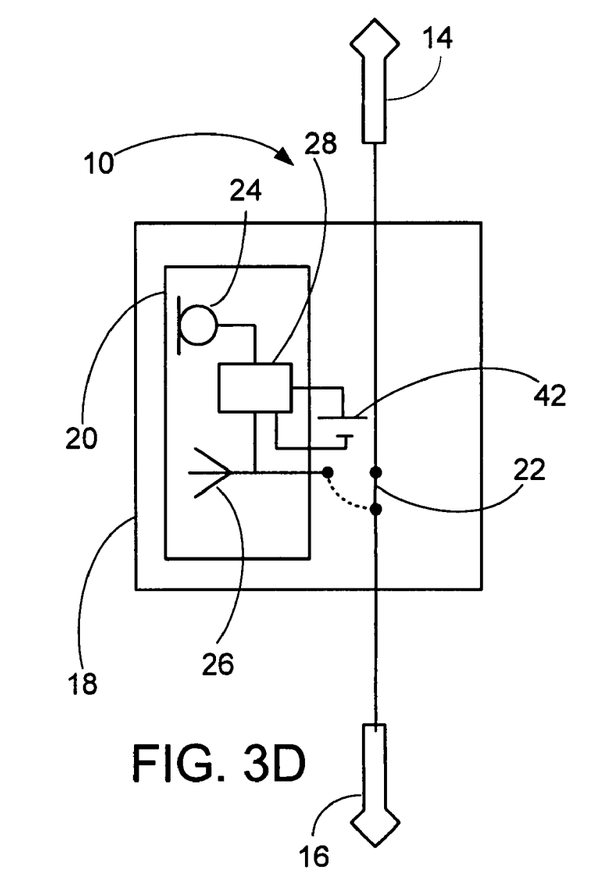

FIGS. 3A-3D show the accessory device 10 of FIG. 1A with an additional feature. The device of FIG. 3A has the components of FIG. 1A, and in addition has a power cable 36, with suitable connectors, such as detachable connector elements 38 and 40 at the two ends. In operation, detachable connector element 38 may be inserted into a power input/output jack of audio signal source 34 and detachable connector element 40 may be inserted into a power output/input of headset 32. The accessory device of FIG. 3A permits headset 32 to supply power to audio signal source 34 or permits audio signal source 34 to supply power to headset 32 and permits audio signal source 34 (of FIGS. 2A-2D) or headset 32 (of FIGS. 2A-2D) to supply power for the electronic components of the audio accessory device 10. If audio signal source 34 and headset 32 each have their own power source, the electronic components of the audio accessory device 10 may be powered by the headset 32, as shown in FIG. 3B, or may be powered by the audio signal source 34, as shown in FIG. 3C. For clarity of explanation, detachable connector elements 14, 16, 38, and 40 are shown as separate elements. In an actual implementation, detachable connector elements 14 and 40 and detachable connector elements 16 and 38 can be combined in a single plug. Power from the headset and audio source can be managed using the devices and techniques described in U.S. patent application Ser. No. 11/191,873. Power cable 36 may be physically integrated with cable portions 12A and 12B. Alternatively, the audio accessory may be powered by an internal battery 42, as shown in FIG. 3D. The configurations of FIGS. 3A-3D can also be implemented with the microphoneless wireless communication circuitry 20C of FIG. 1C or 1C.

An accessory device 10 according to FIGS. 1-3 is advantageous over conventional auxiliary input devices because it requires a headset with only one input jack; because it can be adapted to be used with any headset with an input jack; because it allows the user great flexibility in the selection of a cellular telephone component, an audio signal source component, and a headset component of a personal audio system; and because it can be used with a headset that does not contain wireless communications circuitry or circuitry to select between audio signal sources. An accessory device that generates a side tone avoids the unnatural and uncomfortable sensation that may occur when the active or passive noise reduction attenuates the user's own voice and avoids the delay that may result from the transmission of voice signals over a compressed wireless link such as a Bluetooth link.

Figure 4A:
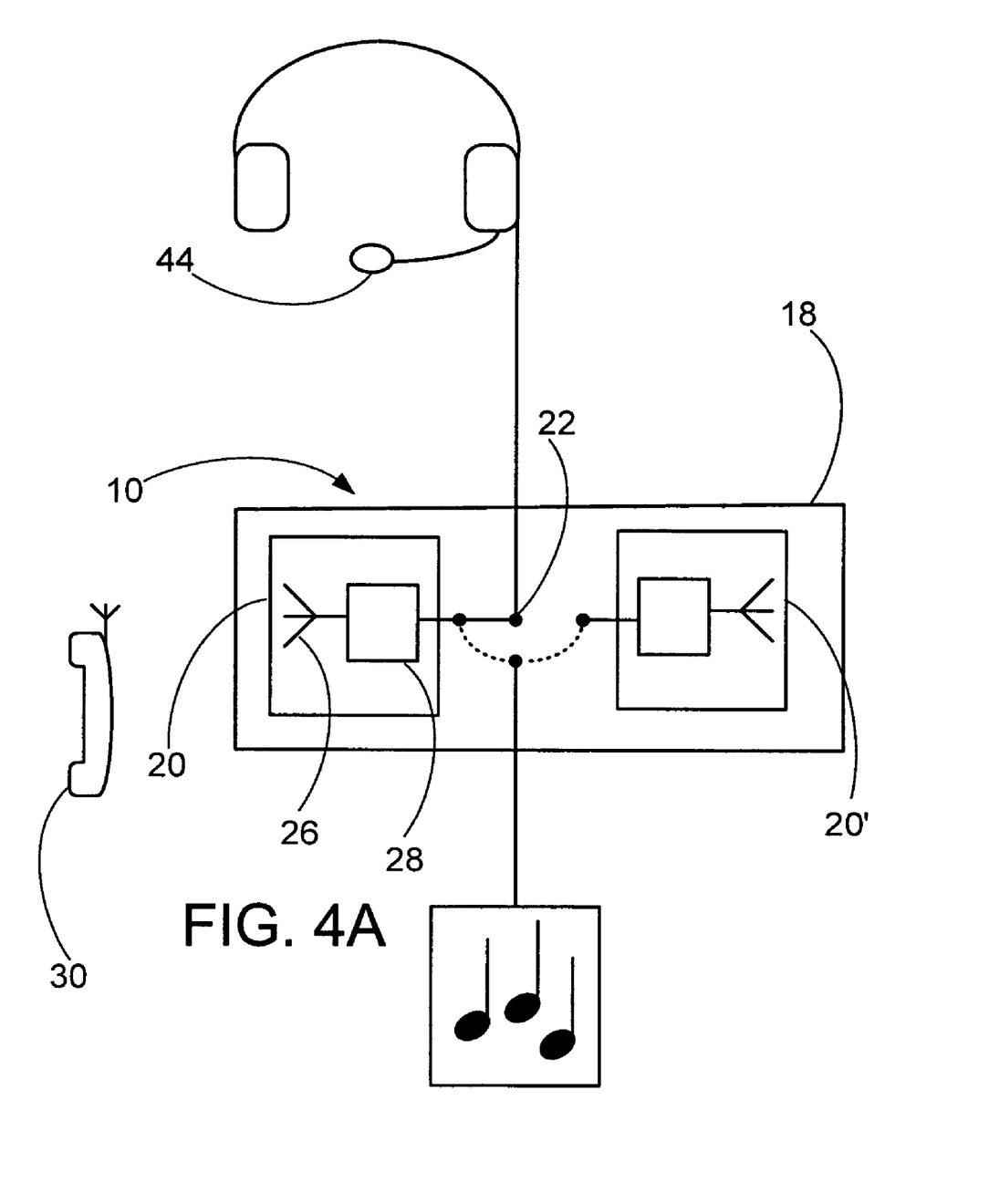
FIGS. 4A and 4B are diagrammatic views of an expanded personal audio system.
Figure 4B:
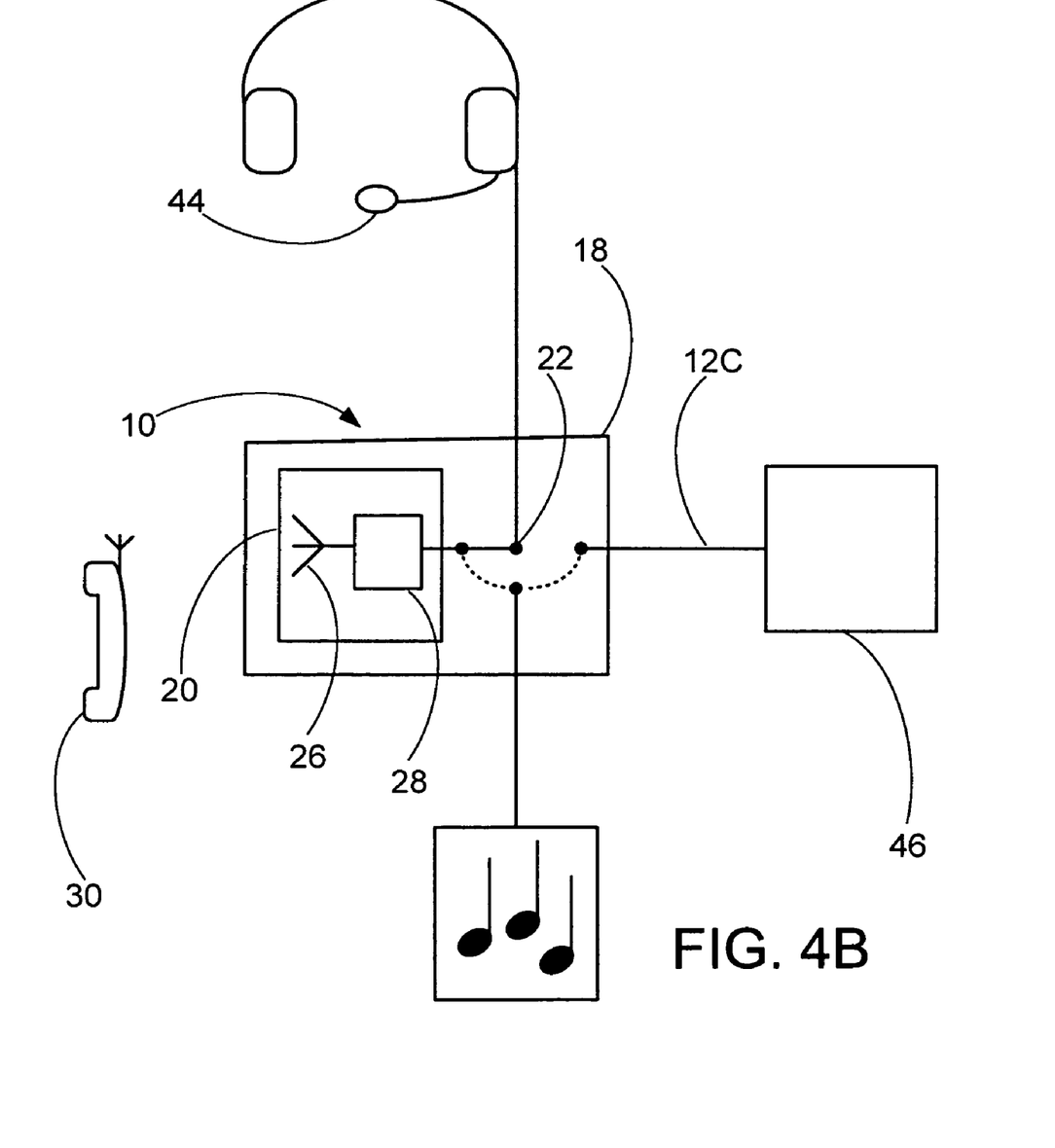

Referring now to FIGS. 4A and 4B, there is shown an expanded personal audio system. The systems of FIGS. 4A and 4B have the elements of FIG. 2B and in addition circuitry for communicating with a third source of audio signals. FIG. 4A includes, for example second wireless communication circuitry 20', which could be for communicating in a wireless intercom network separate from the cell phone network. FIG. 4B includes an additional cable 12C and detachable connector element 16 (not shown in this view) for electrically and mechanically connecting with an external device 46, which could be, for example, a wired local communications system in a building, ship or airliner. The expansion to accommodate the third source of audio signals can be easily done by modification to circuitry in the module 18 such as the switch 22 and does not require redesign of the physical circuitry or the structure of the headset (such as adding additional input jacks). For explanatory purposes, second wireless communications circuitry 20' is shown as distinct from wireless communications circuitry 20. In an actual implementation, wireless communications circuitry 20 and second wireless communications circuitry 20' may share physical components, such as antenna 26. In some implementations, second wireless communications circuitry 20 may be implemented as DSP instructions operating on wireless communications circuitry 20.

Figure 5A:
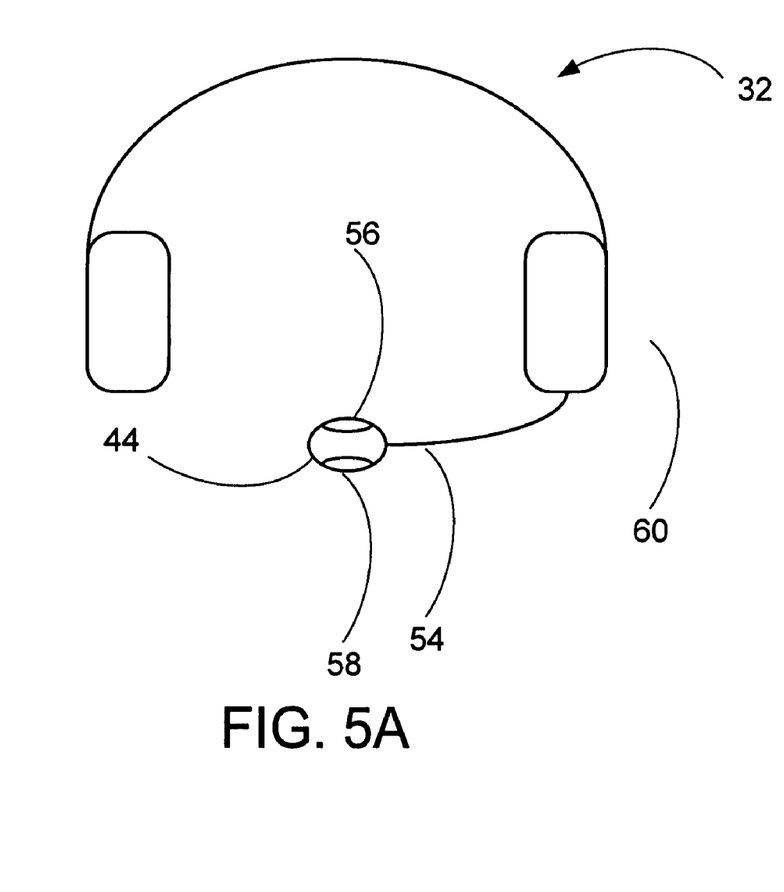
FIGS. 5A and 5B are diagrammatic views of a headset.
Figure 5B:
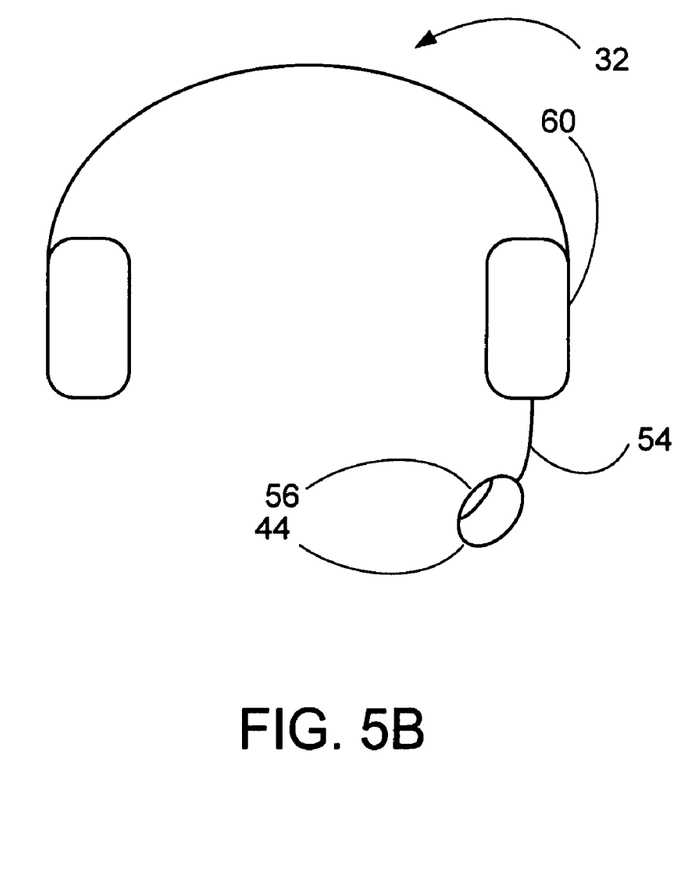

Referring to FIGS. 5A and 5B, there is shown an additional optional feature of the audio device. A headset 32 is mechanically coupled to microphone 44 by a boom 54. The microphone may be a bidirectional microphone with two opposed ports 56 and 58. In FIG. 5A, boom 54 is positioned so that the microphone is near the user's mouth, for example within 4 cm of the corner of the mouth. In FIG. 5B, boom 54 is positioned so that microphone 44 is not near the user's mouth, for example more than 5 cm from the corner of the mouth. Microphone 44 may be configured so that in the position of FIG. 5B with the microphone not near the user's mouth, one of the ports 58 is covered so that microphone 44 is an omnidirectional microphone.

Providing the two positions for the boom microphone can be done in a number of ways, for example by hinging the boom or by making boom 54 to be retractable. Boom 54 can be made retractable in a number of ways. For example, it can be made to retract into earphone 60, into an accessory boom mounting structure attached to earphone 60, and it can include telescoping sections. In the discussion following, the position near the user's mouth and the position not near the user's mouth are done by making the boom retractable. The features discussed below can also be done by, for example, hinging the boom.

The retraction mechanism can be integrated with circuitry constructed and arranged so that the act of moving the microphone from the position of FIG. 5B to the position of FIG. 5A causes wireless communications circuitry 20 to answer a call from cellular telephone 30. The boom microphone can be used in a similar manner with audio signal source equipped cell phones that store audio signals in some format (such as the MP3 format) and which also function as cell phones. The circuitry may be constructed and arranged so that the act of moving the microphone from the unretracted position of FIG. 5A to the retracted position of FIG. 5B the circuitry disconnects from a cell phone call or causes the audio source equipped cell phone to act exclusively as an audio signal source or both. The act of moving the microphone from the retracted position of FIG. 5B to the unretracted position of FIG. 5A answers a cell phone call and/or pauses the transmission from the audio source, and causes the audio source equipped cell phone to operate as a cell phone, with the boom microphone providing voice input to the cell phone. In this configuration, the audio signal source equipped cell phone operates either exclusively as a cell phone, or operates as a cell phone in combination with operating as an audio signal source so that the user can hear both transmissions from the cell phone and music corresponding to the audio signals on the audio signal source. The boom microphone may also be configured so that in the retracted position, one of the ports 58 of FIG. 5A of the bi-directional microphone may be covered, as shown in FIG. 5B so that the microphone is an omnidirectional microphone. In the position of FIG. 5A, the microphone can be used in high noise environments to produce a good speech-to-noise ratio and in the position of FIG. 5B, the microphone can be in a less conspicuous, less distracting, location relative to the user when being used in a low noise environment.

Numerous uses of and departures from the specific apparatus and techniques disclosed herein may be made without departing from the inventive concepts. Consequently, the invention is to be construed as embracing each and every novel feature and novel combination of features disclosed herein and limited only by the spirit and scope of the appended claims.

What is claimed is:

1. An audio accessory comprising:
    a first circuit for wirelessly receiving audio signals from a first external source of audio signals;
    a second circuit for mechanically coupling to a second external source of audio signals for receiving the audio signals from the second external source of audio signals;
    controlling circuitry for controlling the relative amplitude of audio signals from the first external source and the second external source transmitted to a playback device;
    a connector for detachably coupling to the playback device to transmit audio signals from the controlling circuitry to the playback device;
    circuitry communicatingly coupling the controlling circuitry and the connector for transmitting audio signals from the controlling circuitry to the connector; and
    circuitry for generating a side tone proportional to a microphone signal for transmission to the playback device that allows the user to hear what the user says.

2. An audio accessory in accordance with claim 1, wherein the second circuit is constructed and arranged to wirelessly receive audio signals.

3. An audio accessory in accordance with claim 1, wherein the connector is constructed and arranged to mate with a headset.

4. An audio accessory in accordance with claim 1, wherein the first external audio signal source is a cellular telephone, the audio accessory further comprising a microphone for providing voice audio signals and circuitry constructed and arranged to transmit the voice audio signals from the microphone to the cellular telephone.

5. An audio accessory in accordance with claim 4, wherein the microphone is a boom microphone comprising a boom assembly;

the circuitry constructed and arranged to transmit the voice audio signals from the microphone and the connector comprises circuitry integrated into the boom assembly coupling the microphone and the connector; and the connector is constructed and arranged to mechanically and electrically couple the boom microphone to a headset.

6. An audio accessory in accordance with claim 5, wherein the audio accessory is configured so that the boom microphone has a retracted position and an unretracted position.

7. An audio accessory in accordance with claim 6, wherein, in the retracted position, the boom microphone is configured as an omnidirectional microphone and in the unretracted position, the boom microphone is configured as a bidirectional microphone.

8. An audio accessory in accordance with claim 5, the controlling circuitry comprising a switch to select audio signals from one of the first circuit and the second circuit, and wherein the audio accessory is configured so that moving the boom microphone from the retracted position to the unretracted position causes the switch to select the audio signals from the first circuit.

9. An audio accessory in accordance with claim 4, wherein the microphone is a noise reducing microphone.

10. An audio accessory in accordance with claim 1, further comprising a cable constructed and arranged to transmit electrical power to at least one of the audio accessory, the first audio signal source and the second audio signal source.

11. An audio accessory in accordance with claim 1, wherein the controlling circuitry comprises a switch for alternately selecting from the audio signals from the first audio signal source and audio signals from the second audio signal source for transmission to the connector.

12. An audio accessory in accordance with claim 11, further comprising a third circuit for receiving audio signals from a third audio signal source, wherein the selecting circuitry is constructed and arranged to alternatively select audio signals from the first external source, the second external source, and the third external source for transmission to the external playback device.

13. An audio accessory in accordance with claim 11, further comprising circuitry for pausing the operation of the external source generating the nonselected audio signals.

14. An audio accessory in accordance with claim 1, further comprising circuitry for communicating with a third external source of audio signals.

15. An audio accessory in accordance with claim 14, wherein the circuitry for communicating with a third external source of audio signals and the first circuit share physical components.

16. An audio accessory in accordance with claim 1, wherein the communicatingly coupling circuitry is an electrical cable.

17. A headset assembly, comprising:

a headset; and an accessory device for providing audio signals to the headset through a single input jack of the headset, the accessory device comprising receiving circuitry for receiving audio signals from a plurality of audio signal sources, the receiving circuitry comprising circuitry for wirelessly receiving audio signals from a wireless transmitter;

controlling circuitry for controlling the relative amplitude of audio signals from the plurality of audio signal sources for transmission to the headset through the single input jack; and circuitry for generating a side tone proportional to a microphone signal for transmission to the headset that allows the user to hear what the user says.

18. A headset assembly in accordance with claim 17, wherein the receiving circuitry for wirelessly receiving audio signals is constructed and arranged to receive audio signals wirelessly transmitted from a cellular telephone.

19. A headset assembly in accordance with claim 18, the headset further comprising a microphone for transducing pressure waves to voice audio signal, the accessory device further constructed and arranged to transmit the voice audio signals from the microphone to the cellular telephone.

20. A headset assembly in accordance with claim 18, the accessory device further comprising a boom microphone, wherein a plug and the single input jack mechanically couple the accessory device to the headset.

21. A headset assembly in accordance with claim 17, wherein the accessory device is further constructed and arranged to transmit electrical power from the headset to the receiving circuitry.

22. A headset assembly in accordance with claim 17, wherein the controlling circuitry comprises a switch for alternatively selecting audio signals from one of the plurality of audio signal sources and another of the plurality of audio signal sources for transmission to the headset through the single input jack.

23. A headset assembly in accordance with claim 22, the accessory device further including circuitry for pausing the operation of the source of the nonselected audio signals.

24. A method for operating a personal audio system, comprising:

wirelessly receiving first audio signals from a first audio signal source;

receiving second audio signals from a second audio signal source;

controlling the relative amplitude of the first audio signals and the second audio signals for transmission to a playback device to provide amplitude controlled first audio signals and second audio signals;

transmitting the amplitude controlled first and second audio signals through a single cable to the playback device and;

generating from an accessory device a side tone proportional to a microphone signal for transmission to the playback device that allows the user to hear what the user says.

25. A method for operating a personal audio system in accordance with claim 24, wherein the receiving the second audio signals comprises wirelessly receiving the second audio signals.

26. A method for operating a personal audio system in accordance with claim 24, wherein the first audio signal source comprises a cellular telephone, the method further comprising transducing pressure waves to voice audio signals; and transmitting the voice audio signals to the cellular telephone.

27. A method for operating a personal audio system in accordance with claim 26, wherein transmitting the voice audio signals comprises transmitting the voice audio signals through the single plug, jack, and cable.

28. A method for operating a personal audio system in accordance with claim 24, further comprising providing electrical power from the playback device to at least one of circuitry for receiving the first audio signals, circuitry for receiving the second audio signals, and controlling the relative amplitude of the first audio signals and the second audio signals.

29. A method for operating a personal audio system in accordance with claim 24, wherein the controlling comprises alternatively selecting audio signals from one of the first audio signal source and the second audio signal source for transmission to the playback device.

30. A method for operating a personal audio system in accordance with claim 29, further comprising pausing the audio signal source providing the nonselected signals.

31. An audio device comprising:

an active noise reduction headset;

a microphone;

an accessory coupling a cellular telephone to the active noise reduction headset for transmitting audio signals from the microphone to the cellular telephone, the accessory comprising circuitry for generating a side tone proportional to a microphone signal for transmission to the active noise reduction headset that allows the user to hear what the user says.

32. An audio device in accordance with claim 31, wherein the microphone is a noise reduction microphone.

\* \* \* \* \*

UNITED STATES PATENT AND TRADEMARK OFFICE
CERTIFICATE OF CORRECTION

PATENT NO. : 7,627,352 B2 Page 1 of 1
APPLICATION NO. : 11/390718
DATED : December 1, 2009
INVENTOR(S) : Gauger, Jr. et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 709 days.

Signed and Sealed this

Second Day of November, 2010

David J. Kappos
*Director of the United States Patent and Trademark Office*